United States Patent [19]

French et al.

[11] 4,006,271

[45] Feb. 1, 1977

[54] ABRASION RESISTANT COATING FOR POLYCARBONATE SUBSTRATES

[75] Inventors: Hollis E. French, N. Chelmsford, Mass.; Juergen M. Kruse, Rockville, Md.

[73] Assignee: Itek Corporation, Lexington, Mass.

[22] Filed: Jan. 28, 1976

[21] Appl. No.: 653,179

[52] U.S. Cl. .................. 427/164; 260/46.5 UA; 350/175 NG; 351/166; 427/40; 427/341; 427/377; 427/379; 427/387; 428/412; 428/447

[51] Int. Cl.[2] .................. B32B 27/28; G02C 7/02

[58] Field of Search .............. 260/46.5 R, 46.5 UA; 427/38, 40, 162, 164, 340, 341, 377, 379, 387; 428/412, 447; 350/175 NG; 351/166

[56] References Cited

UNITED STATES PATENTS

| | | | |
|---|---|---|---|
| 3,458,342 | 7/1969 | Cormia | 428/412 X |
| 3,637,416 | 1/1972 | Misch et al. | 428/412 |
| 3,650,808 | 3/1972 | Gagnon | 428/447 X |
| 3,708,225 | 1/1973 | Misch et al. | 428/447 X |
| 3,713,880 | 1/1973 | Krekeler | 427/162 |
| 3,953,115 | 4/1976 | French et al. | 428/447 X |
| 3,955,035 | 5/1976 | Ito et al. | 428/447 X |

*Primary Examiner*—Michael R. Lusignan
*Attorney, Agent, or Firm*—Homer O. Blair; Robert L. Nathans; David E. Brook

[57] ABSTRACT

A process is disclosed for applying an adherent, optically clear, abrasion resistant coating to polycarbonate substrates such as lenses. The process includes: (a) forming a coating solution containing 25–75% of a hydrolyzed $C_1$–$C_2$ alkyltri(lower alkoxy)silane, such as methyltriethoxysilane, in a water-miscible, volatile, organic solvent, and also containing small amounts of an abrasion-resistance enhancer and a stabilizing weak acid; (b) applying a thin, uniform coating of the coating solution to a clean surface of the polycarbonate substrate; and, (c) dehydrating the coated substrate under low humidity conditions at an elevated temperature below the temperature at which the substrate degrades until an adherent, abrasion resistant coating is formed.

10 Claims, No Drawings

ABRASION RESISTANT COATING FOR POLYCARBONATE SUBSTRATES

BACKGROUND OF THE INVENTION

1. Field of the Invention

The invention relates to coatings for polycarbonate substrates and more particularly to optically clear, abrasion resistant, adherent coatings for polycarbonate lenses.

2. Description of the Prior Art

Polymeric ophthalmic lenses have become increasingly popular recently due to their fine optical properties, dimensional stability, impact resistance, light weight, etc. One serious disadvantage, nevertheless, to polymeric ophthalmic lenses, has been their susceptibility to scratching, particularly compared to traditional glass lenses. This is particularly true of polycarbonate lenses.

Much research has been devoted to providing coatings for polymeric lenses to improve their abrasion resistance. To date, however, none of the resultant coatings have proven totally successful as evidenced by their lack of commercial acceptance. This is probably because of the stringent requirements in optical and mechanical properties necessary in such coatings.

An example of one type of coating provided to solve this problem is given in U.S. Pat. No. 3,637,416 to Misch et al. The coatings described in the Misch et al. patent are applied by coating a plastic lens with a bonding or coupling film comprising an organic silicon compound and also coating it with a silica or silica gel. The preferred coating technique is a two-step technique, although both coatings can be applied simultaneously. Even in the one-step coating techinque, however, the combination of both an organic silicon compound and a silica or silica gel forming compound is present.

Still other attempts are described in U.S. Pat. No. 3,713,880 to Krekeler et al. The coatings described by this patentee contain alkyl silicates, trifunctional and/or bifunctional organosilanes and antistatic additives.

Many coating compositions designed for polycarbonate substrates are described in the patent literature. Examples of these include: evaporated vitreous mixtures of SiO and $SiO_2$ in U.S. Pat. No. 3,811,753; silyl fluoroolefin polymers in U.S. Pat. No. 3,775,171; organosilanes in U.S. Pat. No. 3,713,880; evaporated layers of glass in U.S. Pat. No. 3,713,869; lightly cross-linked polyvinyl alcohol in U.S. Pat. No. 3,700,487; three layer composites of a hydroxylated polycarbonate, silica and poly(vinyl butyral), and silica and poly(vinyl alcohol) in U.S. Pat. No. 3,652,379; hydrophilic acrylate or methacrylate in U.S. Pat. No. 3,645,779; at least 50 successive vacuum deposited layers of $SiO_x$ in U.S. Pat. No. 3,552,080; hydrophilic acrylate or methacrylate in U.S. Pat. No. 3,488,215; $SiO_x$ coating formed by a glow-discharge oxygen-ion bombardment in U.S. Pat. No. 3,458,342; organopolysiloxane in U.S. Pat. No. 3,451,838 and U.S. Pat. No. 3,389,114; TEMA resins in U.S. Pat. No. 3,265,763; etc.

Despite the large amount of prior research, there is still a need for a process of forming adherent, abrasion resistant, optically clear coatings on polymeric ophthalmic components, and particularly on such components formed from polycarbonate.

SUMMARY OF AN EMBODIMENT OF THE INVENTION

An embodiment of this invention relates to a process by which abrasion resistant, adherent coatings can be applied to polycarbonate substrates such as eyeglass lenses. Successful coatings require careful control of narrowly defined parameters relating to both the compositions used and the coating techniques.

In the first step of the process, a coating solution containing 25–75% of a partially hydrolyzed $C_1$–$C_2$ alkyltri(lower alkoxy)silane in a water-miscible, volatile, organic solvent is formed. This coating solution also contains small amounts of an abrasion-resistance enhancer and a stabilizing weak acid.

A thin layer of the coating solution is applied uniformly to the polycarbonate surface which has been cleaned. The coated surface is subsequently dehydrated at an elevated temperature under dry conditions to provide a coating having the required characteristics.

The coating process and the resultant coated lenses described herein have significant advantages over those previously known in the prior art. For example, the coatings produced have outstanding adhesion to the substrate, often being capable of withstanding immersion in boiling water for 1 hour, or low temperatures such as −40° C on the other hand. The coatings are economical and easy to apply, e.g., they can even be dip or spray coated. A desirable feature of these coatings is their compatibility with many dyes which can be used to tint lenses. The dyes can be added to a common solvent which results in greatly simplified tinting procedures. A most significant advantage, of course, is the outstanding toughness, optical clarity, abrasion resistance and adhesion which can be obtained with these coatings.

DESCRIPTION OF THE INVENTION

The silane compounds suitable for producing the coatings described herein are $C_1$–$C_2$ alkyltri($C_1$–$C_2$ alkoxy)silanes. The alkoxy groups can be the same, but need not be. Above $C_2$ alkoxy, the silanes are too shielding about the Si-O bond which tends to interfere with hydrolysis.

Suitable silanes can be represented by the following structural formula:

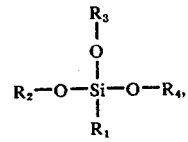

wherein $R_1$, $R_3$ and $R_4$ are individually selected from methyl and ethyl groups.

The silane is dissolved in a solvent in an amount of from about 25 to about 75% by weight and preferably in an amount around 50%. The amounts are based on the original, unhydrolyzed solution. As a general proposition, it is desirable to have just enough solvent to create one homogeneous phase while hydrolysis is taking place to achieve the highest concentration of coating components consistent with good coating characteristics.

Preferred solvents are water miscible, lower molecular weight ($C_6$ or less), organic solvents. Included are such compounds as methanol, ethanol, propanol, isopropanol, acetone, methyl ethyl ketone and methyl isobutyl ketone. Isopropanol is a preferred solvent because of its volatility, cost and ready miscibility with both phases. In choosing a solvent, those skilled in the art will recognize that a balance is made between volatility and water miscibility on the one hand, and ability to dissolve the silane on the other hand.

Certain non-water miscible solvents such as benzene can also be used, but certain adjustments have to be made which make such solvents non-preferred.

The silane solution is partially hydrolyzed before it is coated on the polycarbonate substrate to achieve the desired coating rheology and proper hardening conditions. This can be accomplished by adding a dilute aqueous acidic solution to the silane solution, the acid acting to catalyze hydrolysis. For example, from about 7 to about 30 parts of 0.001 to 0.1N hydrochloric acid can be used per 100 parts of silane solution. Other dilute acids such as sulfuric, nitric, acetic, etc., can also be used.

The amount of hydrolysis desirable at this point is that which results in a desirable coating rheology and ultimate hardness. Additionally, when the lens is coated, it is desirable to have the coating rapidly become "dust dry," i.e., dust will not stick to the surface thereof. This facilitates handling of the lens during subsequent processing.

Abrasion-resistance enhancers are added to the partially hydrolyzed solutions. Such enhancers serve to perform several functions including: improving hardness of the cured coating; improving adhesion of the cured coating; and decreasing cure time. Suitable abrasion-resistance enhancers typically are amino compounds and include amino($C_1$–$C_8$ aklyl)tri($C_1$ to $C_3$ alkoxy)silanes such as gamma aminopropyltriethoxysilane and N(beta-amino ethyl)-gamma aminopropyltrimethoxysilane. From about 1.1 to about 20 parts, and preferably about 5 to about 15 parts, per 100 parts, by weight, of the coating solution are used. Above about 20 parts, it has been noticed that abrasion-resistance falls off while amounts below about 0.1 do not substantially enhance abrasion-resistance.

In addition to abrasion-resistance enhancers, another ingredient which is added to the partially hydrolyzed solutions is one or more stabilizing weak acids. These are acids having a pKa of between about $5 \times 10^{-3}$ and about $5 \times 10^{-5}$. It is believed that such acids temporarily interferes with the abrasion-resistance enhancer to prevent rapid build-ups in viscosity of the coating solution prior to coating. Thus, one advantage to the use of such acids is rheological stability of the coating solution. Another is that more of the solvents in the solution are given time to evaporate before the coating gels which provides a higher level of abrasion resistance in the final coating. Acids with a pKa of higher than $5 \times 10^{-3}$ are too strong and do not provide enough reversibility in their effect whereas acids having a pKa of lower than $5 \times 10^{-5}$ are too weak and don't seem to dissociate enough to prevent the enhancer from causing a rapid viscosity rise in the coating solution. The preferred stabilizing weak acids are those acids having relatively high volatility such as acetic acid. Non-volatile acids can also be used, but have to be neutralized in situ prior or during coating. The stabilizing weak acid is added in at least an amount of 0.05 parts/part enhancer, and preferably in an amount of from about 0.1 part to about 0.5 parts per part enhancer.

Before the optical substrate is coated, it must be rigorously cleaned. The technique used is not as important as the result. Some liquids such as alcohols or other non-solvent, non-crazing chemicals for polycarbonate can be used. Flame cleaning also is suitable, as is the dichromate cleaning solution described in U.S. Pat. No. 3,451,838 at col. 6. Of course, if the lens surface were absolutely clean, such as might be the case with a brand new lens in a clean environment, cleaning may not be necessary.

The substrates can be coated with the pre-hydrolyzed solution by standard techniques such as spin coating, spray coating, dip coating, etc. Coating thicknesses, as applied wet, can range from about 0.5 to 25 microns and are preferably in the range of from about 3 to about 12 microns. The preferred dry coatings are about 1.5–6 microns thick. It is important, of course, to provide an even, uniform coating on most optical components, particularly ophthalmic lenses.

The coated components can be subsequently hydrolyzed further in a high humidity environment, such as one having a relative humidity of equal to or greater than about 70% at a temperature in the range of from about 20° C to about 80° C. This step is optional, however, and it is preferred to omit it.

The substrate with its hydrolyzed coating is then dehydrated at an elevated temperature and low humidity conditions to form a silica-like network having Si—O—Si bonds. Preferred humidities are below 10% relative humidity, and particularly preferred are those of less than 1% often found in drying ovens. The lower temperature limit is established by practical cure times, and the upper limit is established by the thermal stability of the plastic substrate. With polymerized polycarbonate substrates, it has been found that temperatures from about 70° to about 125° C and times of between about 2 and 200 hours are satisfactory. Preferably, the temperatures are 115°–125° C, which normally result in dehydration times of about 8–20 hours. Above about 125° C, polycarbonate softens and deforms. In this dehydration step, it has been noted that the surface hardness appears first, followed by adhesion to the polycarbonate substrate.

An additional optional ingredient comprises a solvent soluble dyestuff. In fact, this can be a unique advantage of the coating solutions described herein since many dyestuffs are soluble in the same solvents used for the silanes and are also chemically compatible with the partially reacted silanes. This is a great advantage in forming tinted lenses since the dyes used can be uniformly distributed in the coating solutions. Examples of such dyes include:

DuPont Luxal Fast Yellow T
DuPont Luxal Fast Blue MBSN
BASF Spirit Soluble Fast Blue H&L
Sandoz Acetosol Blue GLS
Ciba Orasol Red B
Ciba Orasol Red 2B
Ciba Orasol Yellow GN
Ciba Orasol Black CN.

Still another optional additive is one or more compatible leveling agents. These can be added in very small concentrations to optimize the coatings.

Although an emphasis was placed herein on transparent ophthalmic polycarbonate substrates, any other polycarbonate substrate could be coated using the processes and compositions disclosed herein.

In some cases, the expansion coefficient of the polycarbonate substrate can cause the cured coating to craze. In such cases, it has been helpful to add up to about 5% of propyltriethoxysilane, hydrolyzed in the same manner, to overcome this problem. Although such coatings have slightly inferior abrasion-resistance, they are vastly superior in flexibility and crazing resistance.

EXAMPLE 1

Methyltrimethoxysilane, obtained from Union Carbide under the tradename A-163, was purified as follows. A 250 ml. distillation flask was filled to about one-half full with A-163, a few boiling stones and about 10 grams of dry sodium carbonate. The flask was heated and the fraction that came over at 101° C was collected.

55.0 grams of purified methyltrimethoxysilane was introduced into a 250 ml. Erlenmeyer flask to which 50.0 ml. of 0.01 N-hydrochloric acid and 50.0 ml. absolute ethanol were added. The flask was then stoppered and allowed to stand for at least 3 hours to partially hydrolyze the methyltrimethoxysilane solution. 15 ml. of this solution was then introduced into a 50 ml. flask. While swirling, 0.25 ml. of acetic acid, 2.0 ml. ethyleneglycol monohexylether, and 2.5 ml. of distilled gamma-aminopropyltriethoxysilane were added. The latter compound was purified following the same procedure as used for the purification of methyltrimethoxysilane, except that the fraction that distilled off at 220° C was collected. The combined solution was then filtered and coated onto a polycarbonate lens which had been cleaned with isopropyl alcohol. The coated polycarbonate lens was allowed to dry in a clean atmosphere for 30 minutes after which it was transferred to a 50° C drying oven for 30 minutes. The lens was then transferred to a humidity chamber maintained at 45° C and above 90% relative humidity for 30 minutes; this high humidity step is optional. Subsequently, the sample was transferred to a curing oven maintained at 120° C for 12 hours. The resulting coating was optically clear, adhesive and had outstanding abrasion resistance.

After 100 revolutions on the Taber Abraser, 1000 gram load, CS 10 wheel, there were substantial test areas with no scratching visible under microscopic evaluation. Also, there was little evidence of flaking along the scratch lines that were present.

After 1 revolution under a circular 0000 steel wool pad having 1 square inch of area and having a load of 15 lbs., there were no more than several white scratches visible. Microscopically, the sample showed no flaking. Fine scratches were not visible unless the surface was viewed at an angle to an incandescent bulb just off the specular angle.

In addition, the lenses could be immersed in boiling water for 1 hour without showing any deleterious effects such as loss of adhesion.

EXAMPLE 2

The procedure of Example 1 was repeated except that gamma-aminopropyltriethoxysilane was not added. The coating solution maintained its stability but the coating did not dry to a tack-free state after 4 hours. Additionally, after it had dried and was cured, its abrasion resistance was found to be very poor.

EXAMPLE 3

The procedure of Example 1 was repeated except that acetic acid was not added. The viscosity of the coating solution was unstable and rose steadily until it had gelled in 1 hour.

EXAMPLE 4

The procedure of Example 1 was repeated except that only 0.1 cc of gamma-aminopropyltriethoxysilane was used. Less than about 1% is generally considered to be a catalytic amount. The resulting coating solution maintained its viscosity and was stable for 1 week or more. The coating became tack-free in about 5–10 minutes and after cure had some increased abrasion resistance over that obtained in Example 2. However, the abrasion resistance was not considered sufficient and the coating had very poor adhesion to the lens substrate. The Taber and steel wool tests described in Example 1 both produced severe abrasion.

EXAMPLE 5

The procedure of Example 4 was repeated except that no acetic acid was added. The coating solution was stable for 1 day or more. However, the abrasion resistance was not satisfactory and this coating also had poor adhesion to the lens substrate.

EXAMPLE 6

The procedure of Example 1 of U.S. Pat. No. 3,451,838 was followed except for minor variations as noted and except that the benzophenone ultra violet light absorber was omitted and the cure temperature was 123° C instead of 135° C. An ultra violet absorber was omitted since this test was only for abrasion resistance and not for ultra violet stability. The cure temperature was lowered because it has been found that a temperature of 135° C deforms polycarbonate substrates. Thus, the procedure was as follows.

A coating solution was prepared by heating and stirring 100 ml. of a 60% ethanol solution of an organopolysiloxane that was produced by the hydrolysis of two moles of methyltriethoxysilane with one mole of phenyltriethoxysilane. The heating was carried out on a hot plate in a 250 ml. beaker so that a temperature of 140° C was reached within 30 minutes. This heating removed the solvent from the organopolysiloxane and pre-cured the organopolysiloxane to produce a B stage resin. 100 grams of the B stage resin was then slowly dissolved in 100 grams of ethanol. This ethanol B stage resin solution was used for dip application of the organopolysiloxane onto a ⅛ inch thick Lexan brand polycarbonate resin square. The polycarbonate has been flamed treated to ensure uniform adhesion. After permitting the ethanol to flash off at room temperature, the coating panel was cured at 123° C for 18 hours. Panels prepared in this way had a coating thickness of about 0.4 ml.

The coated substrate had better abrasion resistance than uncoated polycarbonate but was still very poor. It could be scratched using slight fingernail pressure and even slight thumb pressure produced scratching.

EXAMPLE 7

The procedure of Example 2 in U.S. Pat. No. 3,451,838 was followed except for the changes noted in Example 6, plus the substitution of ethanol for acetone. Acetone was not used because it is known to attack polycarbonate and to cause stress crazing therein. Thus, the procedure of Example 6 was repeated except that the organopolysiloxane resin utilized was produced by the hydrolysis and condensation of methyltriethoxysilane and ethanol was the solvent medium. The coated panel was then tested from abrasion resistance. The coated surface did resist abrasion with fingernail pressure but the abrasion resistance to steel wool or other abrasives was extremely poor. Pronounced scratching occured under a few grams of pressure with 0000 steel wool.

What is claimed is:
1. A process for forming an abrasion resistant, adherent coating on a polycarbonate substrate, comprising:
   a. forming a coating solution containing from about 25 to about 75% by weight of a hydrolyzed $C_1$–$C_2$ alkyltri(lower alkoxy)silane in a water-miscible, volatile, organic solvent, said solution also containing from about 0.1 to about 20% by weight of an abrasion-resistance enhancer and at least about 0.05 parts of a stabilizing weak acid per part of enhancer;
   b. applying a thin, uniform coating of said coating solution to a clean surface of the polycarbonate substrate; and,
   c. dehydrating said coated component at an elevated temperature until an abrasion resistant, adherent coating is formed.
2. A process of claim 1 wherein said $C_1$–$C_2$ alkyltri (lower alkoxy)silane is methyltriethoxysilane.
3. A process of claim 2 wherein said abrasion-resistance enhancer is an amino($C_1$–$C_8$ alkyl)tri($C_1$–$C_3$ alkoxy)silane.
4. A process of claim 3 wherein said silane enhancer is a compound selected from gamma-aminopropyltriethoxysilane and N(beta-aminoethyl)-gamma-aminopropyltrimethoxysilane.
5. A process of claim 3 wherein said silane enhancer is gamma-aminopropyltriethoxysilane.
6. A process of claim 3 wherein said stabilizing weak acid has a pKa of between about $5 \times 10^{-3}$ and about $5 \times 10^{-5}$.
7. A process of claim 5 wherein said stabilizing weak acid has a pKa of between about $5 \times 10^{-3}$ and about $5 \times 10^{-5}$.
8. A process of claim 5 wherein said stabilizing weak acid is acetic acid.
9. A process of claim 1 wherein said polycarbonate substrate is an optical lens.
10. A process of claim 8 wherein said polycarbonate substrate is an ophthalmic lens.

* * * * *